G. FOMM.
PAPER CUTTING MACHINE.
APPLICATION FILED NOV. 29, 1907.

901,088.

Patented Oct. 13, 1908.

3 SHEETS—SHEET 1.

G. FOMM.
PAPER CUTTING MACHINE.
APPLICATION FILED NOV. 29, 1907.

901,088.

Patented Oct. 13, 1908.

3 SHEETS—SHEET 3.

Witnesses
A. J. Haddan
A. Morrill

Inventor
Georg Fomm
by his Attorney R Haddan

UNITED STATES PATENT OFFICE.

GEORG FOMM, OF LEIPZIG, REUDNITZ, GERMANY.

PAPER-CUTTING MACHINE.

No. 901,088.  Specification of Letters Patent.  Patented Oct. 13, 1908.

Application filed November 29, 1907. Serial No. 404,311.

*To all whom it may concern:*

Be it known that I, GEORG FOMM, engineer, a subject of the King of Saxony, residing at Leipzig, Reudnitz, in the German Empire, have invented certain new and useful Improvements in Paper-Cutting Machines, of which the following is a specification.

This invention relates to a machine for cutting or trimming books and other stacks of paper sheets.

The machine comprises two diagonally guided knives, adapted to be actuated in quick succession, and arranged perpendicularly to each other above a rotatable table, so that a single rotation of the table enables the stack of paper on the table to be cut on four sides. If only three sides are to be cut two stacks may be placed back to back and simultaneously cut. The knives perform a drawing cut, producing a clean edge and requiring small power. The knives and table are adjustable relatively to each other. For example, one knife may be fixed, the other horizontally adjustable, and the table vertically adjustable.

Figure 1:
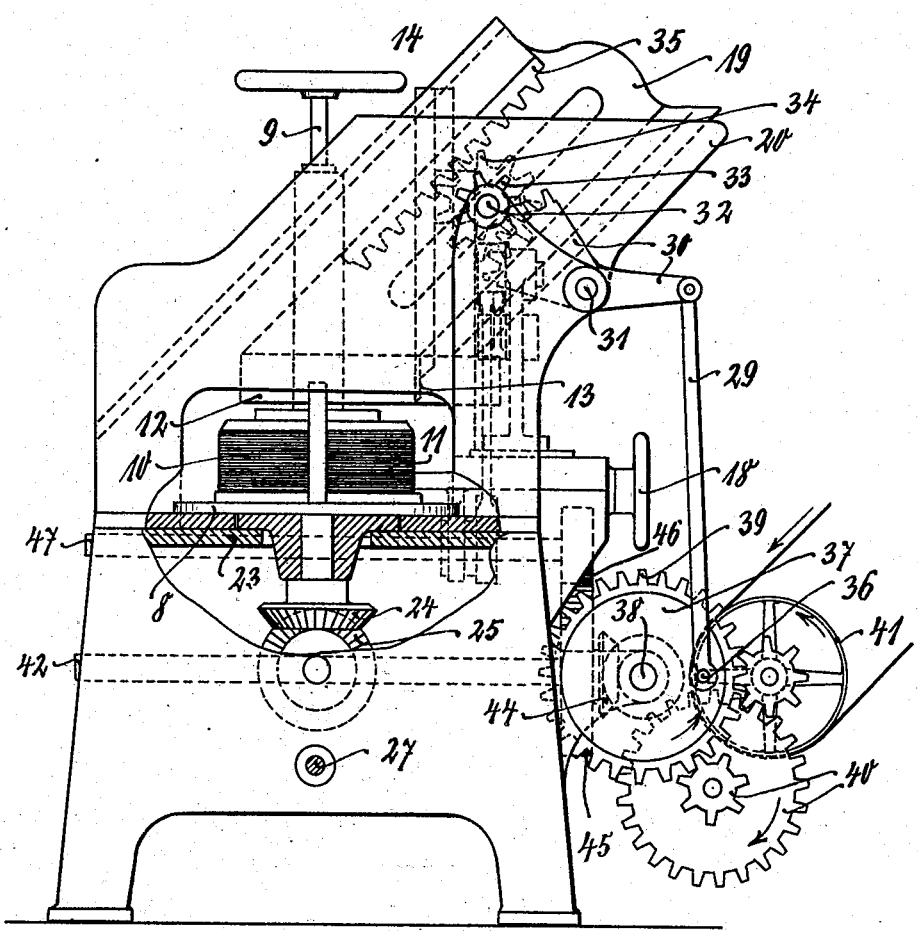
Figure 2:
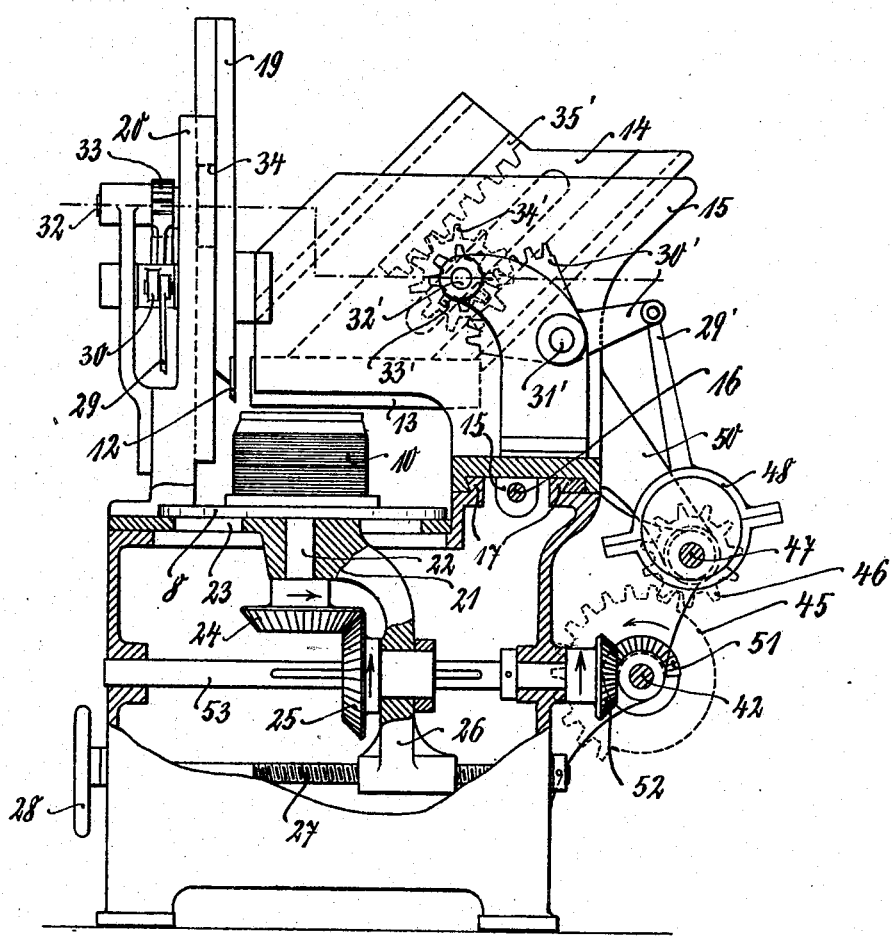
Figure 3:
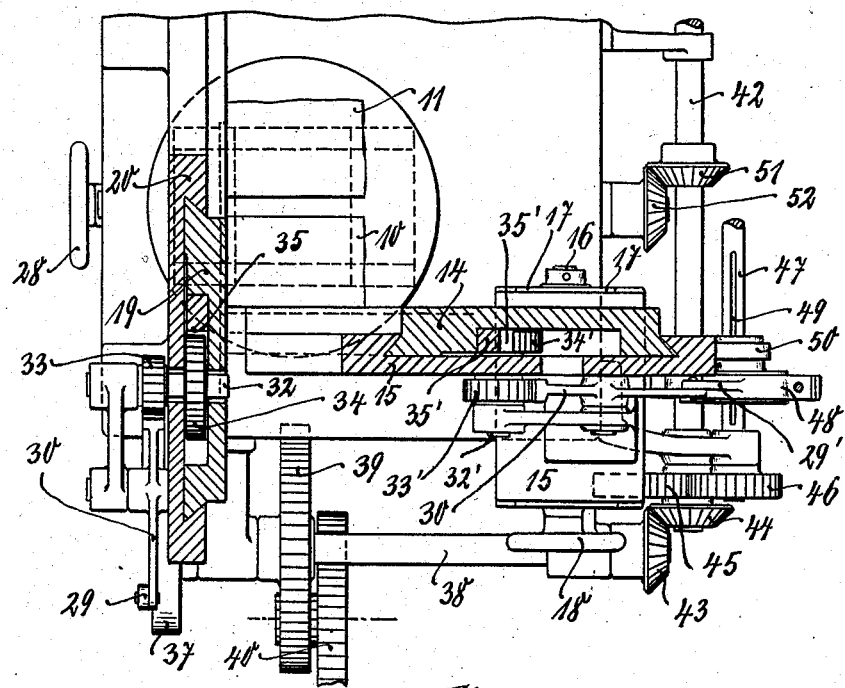
Figure 4:
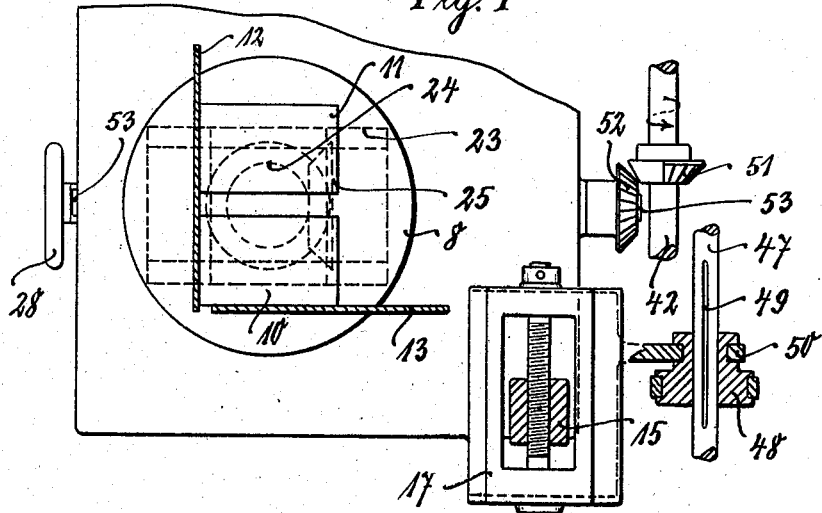

An embodiment of the improved machine is shown in the accompanying drawings, in which Figure 1 is a sectional front elevation. Fig. 2 a sectional side elevation thereof. Fig. 3 a sectional plan view, and Fig. 4 a sectional plan view showing the means for operating the adjustable knife.

The stacks of sheets 10, 11 to be cut are carried by the rotatable table 8, which is preferably arranged so as to be removable and provided with suitable abutments or guides for properly placing the stack in position, said stack being pressed upon the table by the screw spindle 9 in the known manner. The stack on the table 8 is surrounded on two sides by the knives 12, 13, rectangularly disposed relatively to one another and one of which (12) is non-adjustable, while the other one (13) is adjustable in the longitudinal direction of the knife 12.

The diagonally sliding-block 14 carrying the knife 13, is supported by a guide 15, adapted to be moved by means of spindle 16 in the guide or frame 17, a hand-wheel 18 being provided for turning said spindle. Since the slide-block 19 of the other knife 12 is located in a fixed frame 20, the table 8 must be adjustable parallel to the knife 13 and perpendicularly to the knife 12 in order to adjust in this direction also according to the size of stack to be cut. For this purpose the frame 21 on which the table 8 is rotatably mounted about the shaft 22, is carried by suitable guides 23 movably mounted within the frame of the machine. From the said frame 21, which also carries the pair of bevel wheels 24 and 25 for transmission of rotary motion to the table, extending downwards is an arm 26 affording a bearing for the screw spindle 27. Thus by means of the handwheel 28 secured to said spindle the table 8 can be moved perpendicularly to the knife 12. Otherwise, the construction of the machine, as regards the operation of the knives 12 and 13 is known. Both knives are moved in such a manner, that the knife 13 first executes its cutting movement and only when it has returned to its starting position is the knife 12 moved downwards for cutting.

In the example shown the rods 29, $29^1$ operate segments 30, $30^1$ respectively, which rock about the pivots 31, $31^1$ and mesh with the pinions 33, $33^1$ mounted respectively on the shafts 32, $32^1$. Larger pinions 34, $34^1$ mounted on the same shafts, mesh with racks 35, $35^1$ carried by the knife-sliding blocks and thus reciprocate the latter.

The rod 29 of the non-adjustable knife is pivoted to the crank-pin 36 of a crank disk 37, mounted on a shaft 38, the latter also carrying a toothed wheel 39, driven by means of suitable gearing 40 from the driving pulley 41. From the shaft 38, the shaft 42 located rectangularly thereto is driven by means of the pair of bevel wheels 43, 44. On the shaft 42 is keyed a spur-wheel 45 provided for only half its circumference with teeth and which drives a shaft 47 by means of a pinion 46 having the same number of teeth as the wheel 45. The said shaft 47 thus executes a complete revolution during one revolution of the shaft 42, but in half the time and is at rest for the remainder of the period.

On the shaft 47 is movably mounted an eccentric 48 but the latter is caused to participate in the rotation of said shaft 47 by means of a feather slidable in a groove 49 in said shaft. The rod $29^1$, which drives the knife 13 is connected to said eccentric 48 and the latter is embraced by an arm 50 of the slide-block 15, so that it follows all the movements of the latter.

A bevel wheel 51 is mounted on the shaft 42, and is also only toothed for half its circumference. The said wheel meshes with a bevel wheel 52 on the shaft 53, the latter carrying the bevel wheel 25 before referred to for driving the revolving-table 8. The said wheel 25 is movable longitudinally on the shaft 53, so that it can be moved by the arm 26, when the table is adjusted. The driving of the table 8 is effected in such a manner that as soon as the knife 12 has arrived at its central position and the knife 13 is at rest, the table 8 is turned through an angle of 180 degrees by the pair of bevel wheels 24, 25 so that two further sides of the stack of paper or books is brought into position to be cut. It is also possible that both knife-guides 15 and 20 may be stationary. In this case the adjustment of the revolving table for different sizes of stacks can be effected by the use of a cross-support, on which the table is mounted.

What I claim as my invention and desire to secure by Letters Patent of the United States is:—

1. In a paper cutting machine the combination of a revoluble work table, two knives in inclined paths towards and away from said table in planes at right angles to each other, means for positively operating said knives in quick succession and means for adjusting the table perpendicularly to the plane of movement of one of the knives.

2. In a paper cutting machine the combination of a revoluble work-table, two knives movable in inclined paths towards and away from said table in planes at right angles to each other means for positively operating said knives in quick succession, a fixed guide for one of said knives, means for adjusting the table perpendicularly to the plane of movement of the knife working on said fixed guide, a movable support for the other knife and means for adjusting said movable support perpendicularly to the direction of adjustment of the table.

3. In a paper cutting machine the combination of a revoluble work table, two knives movable in inclined paths towards and away from the surface of said table in planes at right angles to each other, means for positively operating said knives successively, whereby one is moved upwards while the other is moved downwards, means for adjusting the table in a direction perpendicular to the plane of one of said knives and means for adjusting the other knife perpendicularly to the direction of adjustment of the table.

4. In a paper cutting machine the combination of an intermittently revoluble work table, two knives movable in inclined paths towards and away from the surface of said table in planes at right angles to each other, slidable rack bars carrying said knives, segment and pinion mechanism for positively reciprocating said bars whereby one is moved upwards while the other is moved downwards, a fixed frame for guiding one of said knife carrying bars, means for adjusting the table in a direction perpendicular to the plane of the knife working in said fixed frame, a movable frame for carrying the other knife carrying bar and means for adjusting said movable frame perpendicularly to the direction of adjustment of the table.

In witness whereof I have signed this specification in the presence of two witnesses.

GEORG FOMM.

Witnesses:
  HERM. TARK,
  RUDOLPH FRICKE.